(12) United States Patent
Lombard et al.

(10) Patent No.: US 8,360,783 B2
(45) Date of Patent: Jan. 29, 2013

(54) AURAL, NEURAL MUSCLE MEMORY RESPONSE TOOL AND METHOD

(76) Inventors: Robert Lombard, Orlando, FL (US);
Robert Lombard, Jr., Orlando, FL (US); Barbara Lombard, Orlando, FL (US); Brian Lombard, Orlando, FL (US)

( * ) Notice: Subject to any disclaimer, the term of this patent is extended or adjusted under 35 U.S.C. 154(b) by 920 days.

(21) Appl. No.: 12/425,377

(22) Filed: Apr. 16, 2009

(65) Prior Publication Data

US 2010/0266997 A1 Oct. 21, 2010

(51) Int. Cl.
*G09B 19/00* (2006.01)
(52) U.S. Cl. .................................................... 434/236
(58) Field of Classification Search .................. 434/126, 434/236, 276, 300, 433; 84/457
See application file for complete search history.

(56) References Cited

U.S. PATENT DOCUMENTS

| | | | | |
|---|---|---|---|---|
| 1,150,856 A | * | 8/1915 | Fair | 84/457 |
| 2,994,241 A | * | 8/1961 | Gibbs | 84/409 |
| 3,106,124 A | * | 10/1963 | Asten | 84/457 |
| 3,269,249 A | * | 8/1966 | Dailey | 84/457 |
| 3,273,530 A | * | 9/1966 | Hill | 116/137 A |
| 3,322,016 A | * | 5/1967 | Ishikawa et al. | 84/457 |
| 3,344,781 A | * | 10/1967 | Allen | 84/457 |
| 3,405,589 A | * | 10/1968 | Myers | 84/457 |
| 3,503,009 A | * | 3/1970 | Horstmann | 331/155 |
| 4,223,177 A | * | 9/1980 | Nakamura | 174/563 |
| 6,599,129 B2 | * | 7/2003 | Jenkins et al. | 434/169 |
| 6,656,062 B2 | | 12/2003 | Vochezer | |
| 7,381,193 B2 | * | 6/2008 | Nogami | 601/46 |
| 7,584,661 B2 | * | 9/2009 | Matsunuma | 73/504.16 |
| D617,669 S | * | 6/2010 | Webb | D10/118 |
| 2006/0105307 A1 | * | 5/2006 | Goldman et al. | 434/236 |
| 2010/0275689 A1 | * | 11/2010 | Wolf et al. | 73/579 |

* cited by examiner

*Primary Examiner* — Kurt Fernstrom
(74) *Attorney, Agent, or Firm* — Mark Young, P.A.

(57) ABSTRACT

An aural, neural muscle memory response tool includes an acoustic resonator in the form of a two-pronged fork with parallel tines formed from a U-shaped bar of elastic metal. The U-shaped bar is attached to a deflector at a curved vertex. The tines are configured to resonate at a determined frequency up to about 20 Hz. A housing houses and stably supports the deflector and also houses a portion of the tines without contacting the tines. Optionally, the tool may include a manually actuatable trigger configured to cause the tines to vibrate when actuated. Use of the tool for training entails performing a task; determining to either associate a sound generated by the tool with the performed task, and if the sound generated by the tool will be associated with the performed task, generating the sound. These steps may be repeated until the training session is complete. Use of the tool for recollection entails determining whether to produce a sound generated by the tool and associated with a task as a muscle memory cue, and if the sound will be produced, producing the sound before the task is performed; and then performing the task.

16 Claims, 4 Drawing Sheets

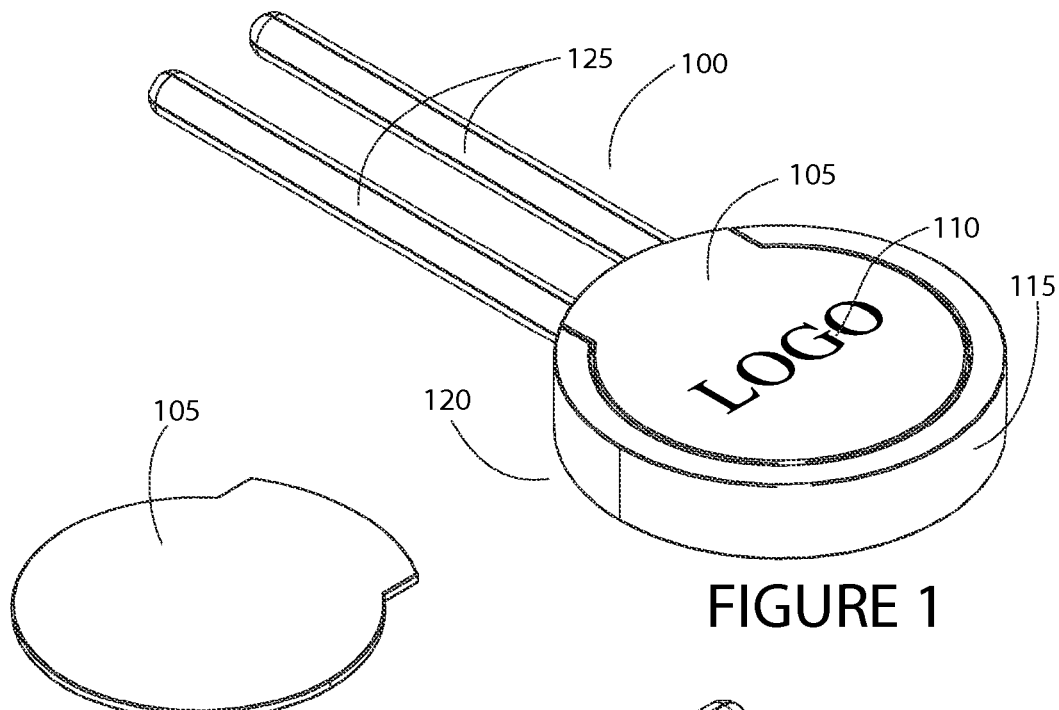
FIGURE 1
FIGURE 2
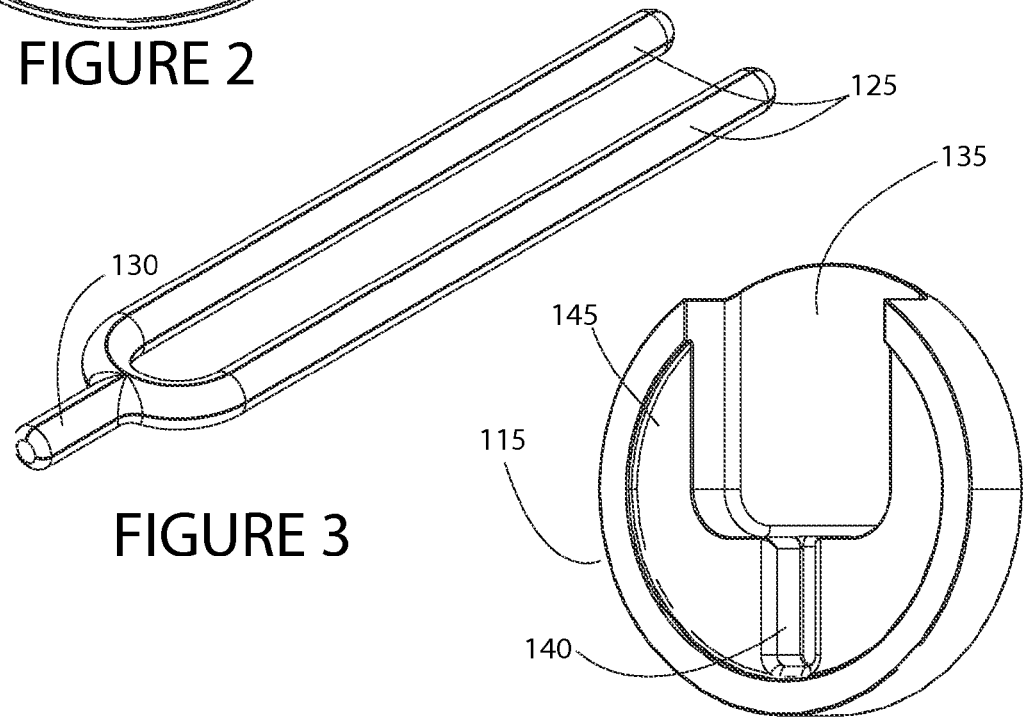
FIGURE 3
FIGURE 4

AURAL, NEURAL MUSCLE MEMORY RESPONSE TOOL AND METHOD

FIELD OF THE INVENTION

This invention generally relates to muscle memory, and more particularly, to a portable device and method configured to produce audible sounds that stimulate recollection and evoke physical responses.

BACKGROUND

Sounds can trigger responses. A certain sound may excite or relax one's body, exhilarate one's soul, bring enjoyment and evoke a whole range of emotions. Physiological responses in reaction to sound stimuli have long been observed. For instance, a soothing sound could lead to a decrease in the tension of muscles, respiration rate, and blood pressure. Sounds (e.g., sirens, gunshots, thunder, etc. . . . ) can also elicit strong motor responses from listeners such as a quick turn, a jump or a defensive reaction. Additionally, audible stimuli may alleviate physical distress and pain. Sounds are also believed to be capable of triggering the release of endorphins (an opiate-like substance in the brain), and induce increased release of the neurotransmitter serotonin.

Clothing and cosmetic marketers have long appreciated the relationship between appealing to senses and boosting sales. An attractive silk suit harnesses the senses of sight and touch. The scent of a perfume possesses an uncanny power to conjure up memories. While a connection between sound and human reaction is well documented, audible stimuli have not been isolated and harnessed to their full potential.

One use of sound is an audible cue or trigger, much like a starter's pistol signaling a runner to propel from a starting block or a swimmer to dive from a starting platform. As a person repeatedly trains movement, often of the same activity, such as a swing of a golf club, baseball bat or tennis racket, a in an effort to stimulate the mind's adaptation process, physiological changes occur which facilitate increased levels of accuracy. Such changes are commonly referred to as "muscle memory." Muscle memory is honed over time through repetition of specific motor skills. The mind assimilates the activity and adapts to repetitive training, a process known as "neuromuscular facilitation." Repeated motor skills eventually become instilled in the neural system, which greatly reduces the degree that one must think about an activity to react and perform appropriately.

In the past, association of muscle memory with an audible cue has merely been an unintended byproduct of training. Repeated training and competitive performances ingrain audible cues in the performer's mind. Upon sensing the cues, a trained individual instinctively commences the activity for which he or she has so painstakingly and repeatedly trained.

Unfortunately, however, heretofore a portable personal device configured to generate a distinctive, yet subtle, audible signal tuned for use as an audible cue has not been available. As a consequence of the foregoing, there exists a longstanding need for a personal portable device and method configured to produce audible sounds that stimulate recollection and evoke determined physical responses. The invention is directed to overcoming one or more of the problems as set forth above.

SUMMARY OF THE INVENTION

To solve one or more of the problems set forth above, in an exemplary implementation of the invention, a portable personal device configured to generate a distinctive, yet subtle, audible signal tuned for use as an audible cue is provided. The audible cue stimulates recollection and evokes a determined physiological response.

In one aspect of an exemplary portable personal device configured to generate a distinctive, yet subtle, audible signal tuned for use as an audible cue, includes a tuning fork partially contained in a housing is provided.

In another aspect of the invention, an exemplary aural, neural muscle memory response tool is provided. The tool includes an acoustic resonator in the form of a two-pronged fork with parallel tines formed from a U-shaped bar of elastic metal. The U-shaped bar is attached to a deflector (i.e., tuning fork handle) at a curved vertex. The tines are configured to resonate (i.e., vibrate) at a determined frequency up to about 20 Hz, preferably between 14 to 20 Hz. A housing houses and stably supports the deflector and also houses a portion of the tines without contacting the tines. Concomitantly, vibration of the tines is transmitted through the deflector to the housing, which acts as a resonator amplifying the sound produced. Without a resonator, the sound may be faint. Optionally, the tool may include a manually actuatable trigger configured to cause the tines to vibrate when actuated.

In another aspect of the invention, an exemplary method of using the exemplary aural, neural muscle memory response tool is provided. The method of using such an aural, neural muscle memory response tool includes steps of determining whether the tool will be used for purposes of a training session or for purposes of recollection. If the tool will be used for purposes of a training session then performing a task; determining to either associate a sound generated by the tool with the performed task to facilitate muscle memory development, or to forgo association of the sound generated by the tool with the performed task; if the sound generated by the tool will be associated with the performed task to facilitate muscle memory development, the sound is produced; and repeating these steps until the training session is complete. However, if the tool will be used for purposes of recollection then, determining to either produce a sound generated by the tool and associated with a task as a muscle memory cue, or to forgo producing the sound; if the sound generated by the tool will be produced, producing the sound before the task is performed; and performing the task.

BRIEF DESCRIPTION OF THE DRAWINGS

The foregoing and other aspects, objects, features and advantages of the invention will become better understood with reference to the following description, appended claims, and accompanying drawings, where:

FIG. 1 shows a perspective view of an exemplary portable personal device comprising a tuning fork partially contained in a housing and configured to generate a distinctive, yet subtle, audible signal tuned for use as an audible cue in accordance with principles of the invention; and FIG. 2 shows a perspective view of an exemplary cover for a portable personal device comprising a tuning fork partially contained in a housing and configured to generate a distinctive, yet subtle, audible signal tuned for use as an audible cue in accordance with principles of the invention; and FIG. 3 shows a perspective view of an exemplary tuning fork for a portable personal device comprising a tuning fork partially contained in a housing and configured to generate a distinctive, yet subtle, audible signal tuned for use as an audible cue in accordance with principles of the invention; and FIG. 4 shows a perspective view of an exemplary opened housing for a portable personal device comprising a tuning fork partially contained in a housing and configured to generate a distinctive, yet subtle, audible signal tuned for use as an audible cue in accordance with principles of the invention.

Figure 5:
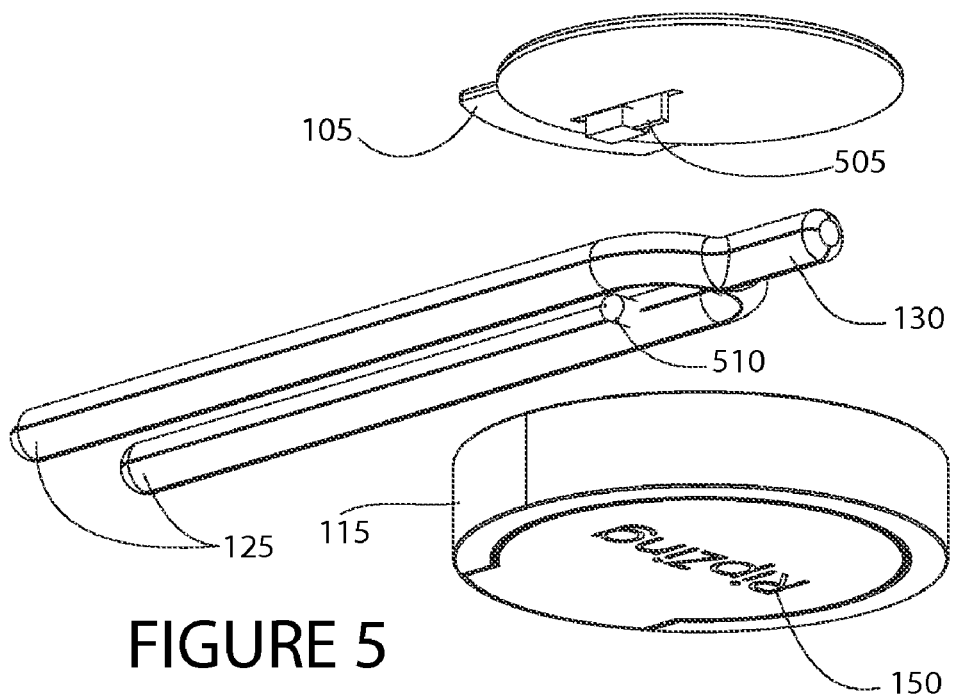
FIG. 5 shows a first perspective exploded view of an exemplary portable personal aural, neural muscle memory response tool with a manually actuated trigger and configured to generate a distinctive, yet subtle, audible signal tuned for use as an audible cue in accordance with principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the configurations, shapes, relative sizes, ornamental aspects or proportions shown in the Figures.

DETAILED DESCRIPTION

Referring to the Figures, in which like parts are indicated with the same reference numerals, various views of exemplary portable personal devices configured to generate a distinctive, yet subtle, audible signal tuned for use as an audible cue are provided. The audible cue stimulates recollection and evokes a determined physiological response. In general the device comprises a partially housed tuning fork with a supported deflector and unimpeded tines.

With reference to FIGS. 1 through 4, the tuning fork 100 is an acoustic resonator in the form of a two-pronged fork with parallel tines 125 formed from a U-shaped bar of elastic metal. The U-shaped bar is attached to a deflector 130 by any suitable attachment means, such as welding, brazing, soldering, etc. The deflector 130 is a stem-like attachment which may be held without appreciably attenuating or otherwise interfering with vibration of the tines. The tines 125 resonate at a specific constant pitch when set vibrating by striking them against or with an object. The pitch is a function of the geometry (e.g., length and diameter) of the tines 125 as well as their material composition. The overall length of the tuning fork is about 2 to 3½ inches, preferably 2⅞ inches. As the tines 125 vibrate, they emit a determined tone by disturbing surrounding air molecules and thereby creating a sound wave.

Figure 7:
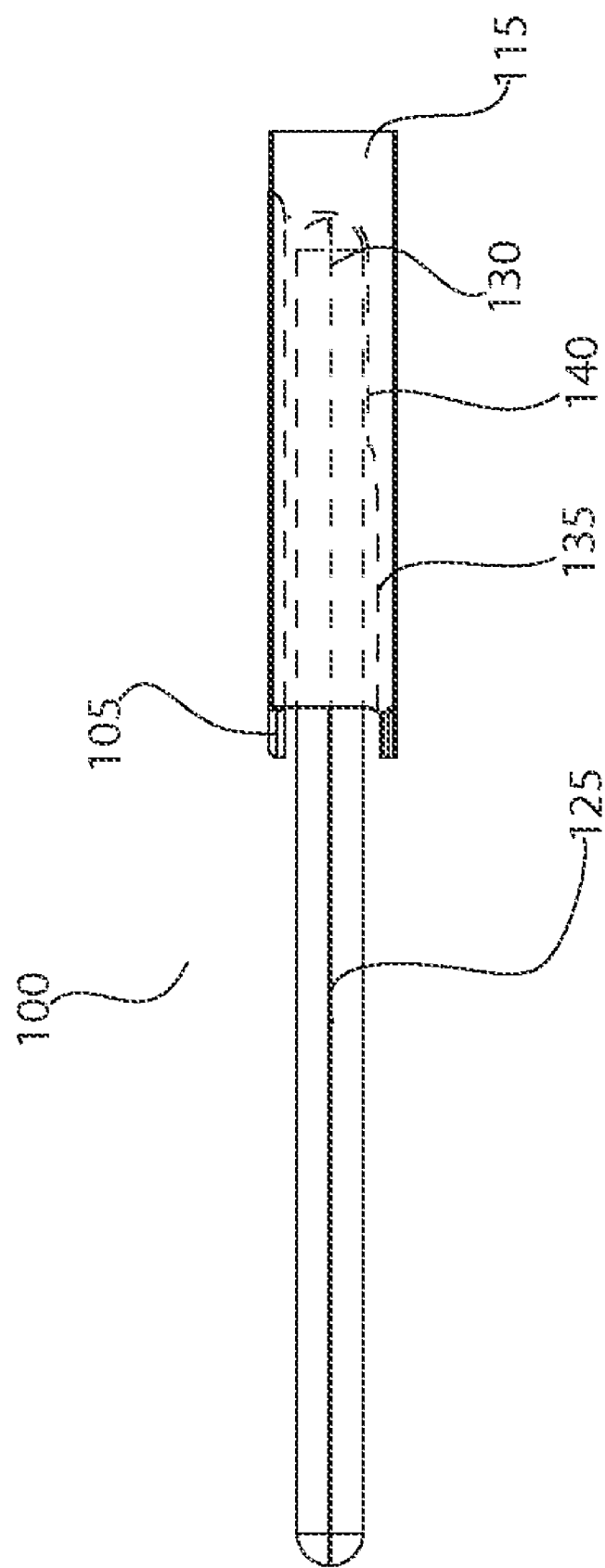
FIG. 7 shows a side view of an exemplary portable personal device comprising a tuning fork partially contained in a housing and configured to generate a distinctive, yet subtle, audible signal tuned for use as an audible cue in accordance with principles of the invention.

A housing 115 supports the deflector 130 and partially contains the tines 125. The housing 115 includes a deflector support 140 configured to receive and stably hold the deflector 130. Optionally, the deflector may be fastened to the deflector support 140 such as by welding, brazing, soldering, bonding or mechanically attaching. The deflector support 140 is recessed to a first depth. A junction compartment 135 is also provided in the housing 115. The junction compartment 135 houses portions of the tines 125 adjacent to the deflector 130. The junction compartment 135 is recessed to a depth that is greater than the first depth of the deflector support 140. The junction compartment 135 is also wider than the maximum outer width of the tuning fork, measured from tine 125 to tine 125. The tuning fork 100 deflector 100 is mounted in the deflector support 140 so that the tuning fork tines 125 project as cantilevers extending outward from the housing 115 and are free to vibrate. Thus, as also shown in the side view of FIG. 7, the deflector support 140 stably supports the deflector 130 while suspending the tines 125 of the tuning fork 100 in the junction compartment 135, free from contact with and interference by the housing 115. Such freedom from contact facilitates unimpeded vibration. Concomitantly, vibration of the tines 125 is transmitted through the deflector 130 to the housing 115, which acts as a resonator amplifying the sound produced. Without a resonator, the sound may be faint.

A cover plate 105 is provided to overlay the deflector support 140 and junction compartment 135. The cover plate 105 may be permanently or releasably attached to the housing 115 using any suitable means of attachment, including, but not limited to, a press fit, a bonding agent, mechanical attachments such as screws, welding, brazing or soldering. While the housing 115 and cover plate 105 may be comprised of a wide array of materials, bar steel is preferred.

Figure 6:
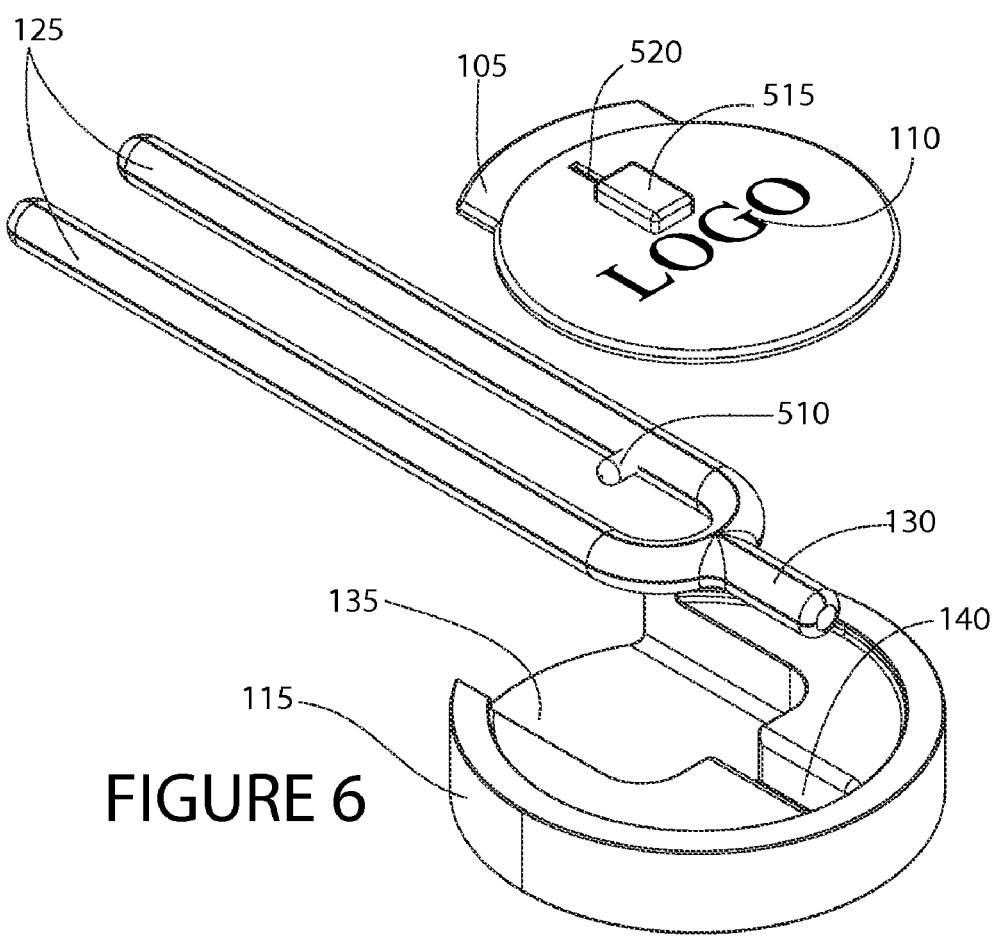
FIG. 6 shows a second perspective exploded view of an exemplary portable personal aural, neural muscle memory response tool with a manually actuated trigger and configured to generate a distinctive, yet subtle, audible signal tuned for use as an audible cue in accordance with principles of the invention.

Now referring to the exploded views of FIGS. 5 and 6, an alternative embodiment is illustrated with a manually actuated trigger and configured to generate a distinctive, yet subtle, audible signal that is tuned for use as an audible cue in accordance with principles of the invention. The tuning fork 100 may be driven by mechanical, electromechanical and/or electromagnetic drive means. In the exemplary embodiment illustrated in FIGS. 5 and 6, a mechanical drive comprising a manual striker is shown. The cover plate 105 includes a manually actuated striker, i.e., a means for directly or indirectly striking a tine and initiating vibration. By way of example and not limitation, one or more protuberances, such as a prong 510, extend from one or both tines 125. A manually operated striker assembly includes a sliding trigger 515 on the exterior surface of the plate 105. The trigger 515 is mechanically coupled to a hammer 505 projecting below the plate 105. The hammer 505 strikes the prong 510 when the trigger 515 is advanced. A slot with a return spring 520 urges the trigger 515 back to its original position.

The device may be adorned with ornamental and informational features for such purposes as aesthetics, promotion and advertising. By way of example and not limitation, indicia such as a logo 110, 150 may be displayed on the cover plate 105, as shown in FIGS. 1 and 6, as well as on the housing 115, as shown in the bottom perspective view of FIG. 5.

In a preferred embodiment, the tines are uniquely configured to resonate at a low frequency up to about 20 Hz (i.e., within 10% of 20 Hz). This frequency is far lower than the 440 Hz (note A), international "concert pitch" of common tuning forks used by musicians as a standard tuning note for orchestras, it being the pitch of the violin's second string played open, the first string of the viola played open, and an octave above the first string of the cello, again played open. A frequency range of 14 to 20 Hz is preferred. A low frequency of about 16 Hz or less, preferably in a C note, is considered favorable for its subtlety and, more importantly, because low frequency sounds provide superior audible cues as muscle memory triggers. The frequency is at or near the lower limit of human perceptible sounds, i.e., infrasound, but remains perceptible particularly when the housing is placed against or in close proximity to a user's ear.

To achieve the desired frequency, the tines are preferably comprised of aluminum, steel or an alloy, and, most preferably, spring steel. Spring steel is a low alloy, medium carbon steel with a very high yield strength and modulus of elasticity (e.g., $30 \times 10^6$ psi) as well as superior resilience. These properties allow the tines 125 to return to their original shape despite significant bending or twisting. By way of example and not limitation "music wire" spring steel, ASTM A228, having about 0.80-0.95% (pbw) carbon may be used. ASTM A228 music wire is manufactured in both inch and metric music wire gauges in diameters as small as 0.006 inch up to 0.192 inch (0.15 to 4.8 mm). The length of the tines is about 1.5 to 3.5 inches. An overall length, including the length of the deflector, may be 2 to 4 inches, e.g., 2.875 inches. However, the invention is not limited to tines of a particular length or diameter.

Based upon the material, the radius and length of cylindrical tines may be determined or estimated using the following equation:

$$f = \frac{r}{\pi l^2}\sqrt{\frac{E}{\rho}} \qquad \text{Equation 1}$$

Where:
f is the frequency of vibration of the tines in hertz;
r is the radius of a tine in square meters;
l is the length of the tines in meters;
E is the Young's modulus of the material the fork is made from in pascals; and
ρ is the density of the material the fork is made from in kilograms per cubic meter.

To reduce corrosion, the tines and deflector may be treated. By way of example and not limitation, a phosphate coating (e.g., zinc or manganese phosphate coating) may be applied. Other corrosion resisting treatments that do not appreciably affect vibrational performance of the tine, such as, but not limited to, hot-dip galvanizing, may be utilized within the spirit and scope of the invention.

Figure 8:
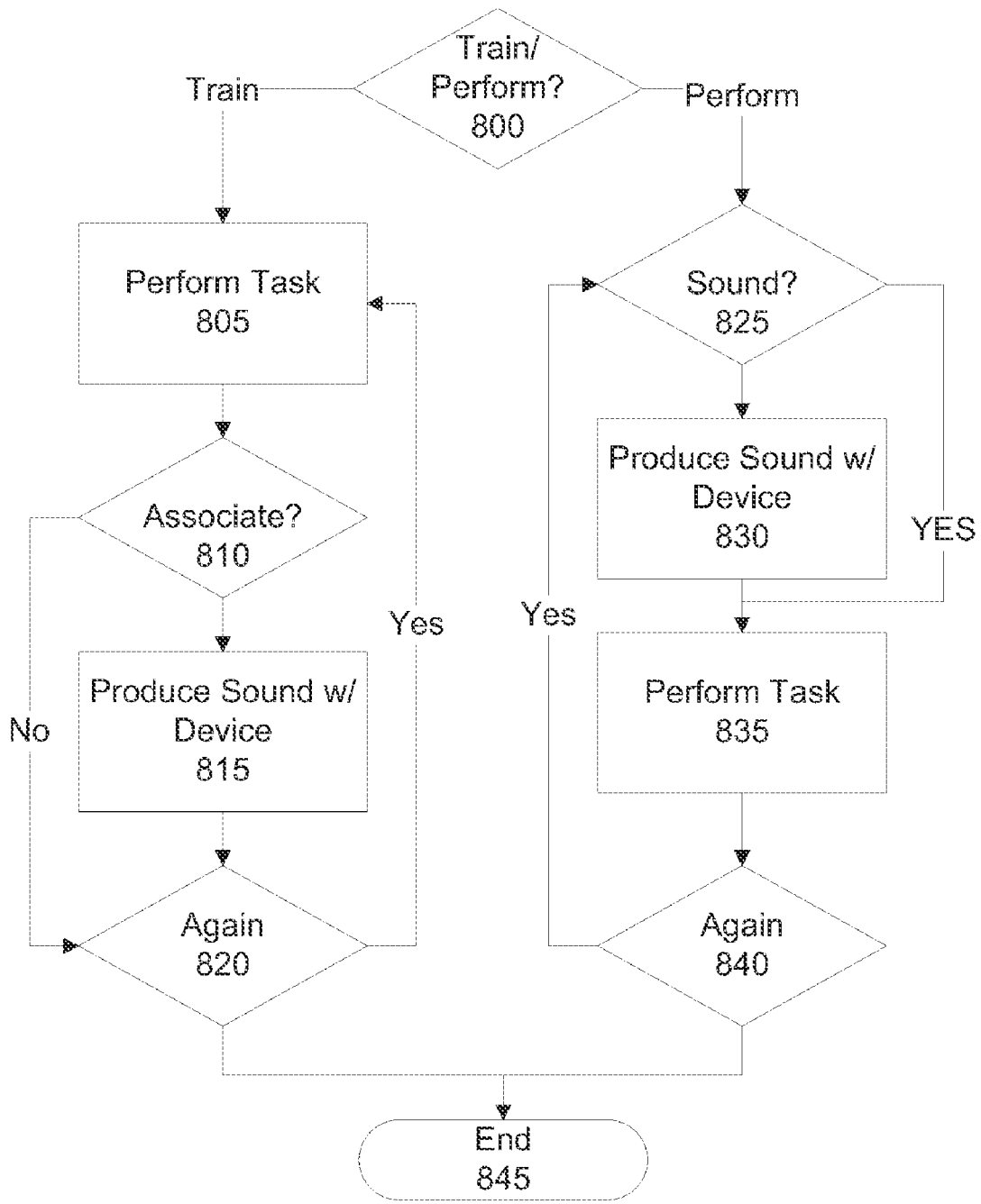
FIG. 8 shows a flowchart of an exemplary method of using a portable personal aural, neural muscle memory response tool as an audible cue in accordance with principles of the invention.

Referring now to the flowchart of FIG. 8, an exemplary method of using the device according to principles of the invention commences with determining whether the device will be used for purposes of training or for purposes of recollection, as in step 800. During training, a task is performed, as in step 805. A determination is made to either associate the sound (i.e., an audible sound) generated by the device with the performed task to facilitate muscle memory development, or to forgo association of the sound generated by the device with the performed task, as in step 810. If the sound generated by the device will be associated with the performed task to facilitate muscle memory development, the sound is produced, as in step 815. The determining factor may be, for example, how well the task was performed. For example, the determination may be based upon whether a goal or objective was achieved, such as whether a golf ball was hit and flew straight and a desired distance. If the task was performed well (e.g., if the determined goal was met), the user may decide to associate the sound. However, an improperly performed task may not be associated. The sequence of steps 805 through 815 may be repeated over and over, as in step 820, until a user decides to end the training session, as in step 845.

During a performance session, the user, who has already developed muscle memory and associated the sound with the task, recalls the sound as an audible cue. If the user cannot vividly recall the sound, he or she may decide, as in step 825, to generate the sound using the device, as in step 830. He or she may also decide, as in step 825, to generate the sound using the device, as in step 830, for other reasons, such as, for example, purposes of triggering or reinforcing muscle memory. Then the user may perform the task to which the sound had been associated, as in step 835. Again, the sequence of steps 825 through 835 may be repeated over and over, as in step 840, until a user decides to end the training session, as in step 845.

When the sound is produced, the user may hold the housing against an ear of the user or in close proximity to an ear of the user, e.g., against the ear or from a fraction of an inch to any distance away from the ear that allows clear perception of the sound produced. The distance will depend upon the user's hearing sensitivity, the frequency of vibration and ambient conditions including background noise.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. An aural, neural muscle memory response tool comprising
an acoustic resonator in the form of a two-pronged fork with parallel tines formed from a U-shaped bar of elastic metal, said U-shaped bar being attached to a linear deflector at a curved vertex, the tines being configured to vibrate at a determined frequency up to about 20 Hz, and
a housing configured to house and stably support the linear deflector and house a portion of the tines without contacting the tines,
said housing including a linear deflector support configured to receive and stably hold the linear deflector, and said housing further including a junction compartment abutting said deflector support, said junction compartment configured to house the curved vertex of the acoustic resonator without contacting any portion of the curved vertex.

2. An aural, neural muscle memory response tool according to claim 1, said linear deflector comprising a stem-like attachment to the curved vertex of the two-pronged fork with parallel tines formed from a U-shaped bar of elastic metal, and said linear deflector not interfering with vibration of the tines.

3. An aural, neural muscle memory response tool according to claim 1, the housing including a linear deflector support being integrally formed in the housing.

4. An aural, neural muscle memory response tool according to claim 1, the housing including a linear deflector support configured to receive and stably hold the linear deflector, said linear deflector being fastened to the linear deflector support.

5. An aural, neural muscle memory response tool according to claim 1, the housing including a linear deflector support configured to receive and stably hold the linear deflector, said linear deflector being mechanically secured by the linear deflector support.

6. An aural, neural muscle memory response tool according to claim 1, the linear deflector support comprising a recess in the housing configured to receive the linear deflector.

7. An aural, neural muscle memory response tool according to claim 1, the linear deflector support being a recess in the housing configured to receive and securely grip the linear deflector, and said junction compartment including an open end through which the tines extend untouched by the housing.

8. An aural, neural muscle memory response tool according to claim 1, the linear deflector support being a recess to a first depth in the housing configured to receive the linear deflector, and said housing further comprising a junction compartment configured to house portions of the tines adjacent to the linear deflector without contacting said portions of the tines, the junction compartment being recessed to a depth that is greater than the first depth of the linear deflector support, and the junction compartment having a width that exceeds the width of the tuning fork, measured from tine to tine.

9. An aural, neural muscle memory response tool according to claim 1, said housing further comprising a cover plate configured to overlay the linear deflector support and junction compartment.

10. An aural, neural muscle memory response tool according to claim 1, said housing further comprising a removable cover plate configured to overlay the linear deflector support and junction compartment.

11. An aural, neural muscle memory response tool according to claim 1, said housing further comprising a permanently fixed cover plate configured to overlay the linear deflector support and junction compartment.

12. An aural, neural muscle memory response tool according to claim 1, further comprising a manually actuatable trigger configured to cause the tines to vibrate when actuated.

13. An aural, neural muscle memory response tool according to claim 1, said tines being configured to vibrate at a frequency of 14 to 20 Hz.

14. An aural, neural muscle memory response tool according to claim 1, said tines being configured to vibrate in a C note.

15. An aural, neural muscle memory response tool according to claim 1, said tines being comprised of spring steel having about 0.80-0.95 percent by weight carbon.

16. An aural, neural muscle memory response tool according to claim 1, said linear deflector transmitting vibration of the tines to the housing, said housing being configured to amplify sound.

* * * * *